United States Patent
Hiruma

(10) Patent No.: US 7,499,143 B2
(45) Date of Patent: *Mar. 3, 2009

(54) LIQUID CRYSTAL DISCHARGING METHOD, AND LIQUID CRYSTAL DISCHARGING DEVICE

(75) Inventor: Kei Hiruma, Chinoshi (JP)

(73) Assignee: Seiko Epson Corporation (JP)

( * ) Notice: Subject to any disclaimer, the term of this patent is extended or adjusted under 35 U.S.C. 154(b) by 211 days.

This patent is subject to a terminal disclaimer.

(21) Appl. No.: 10/797,661

(22) Filed: Mar. 10, 2004

(65) Prior Publication Data

US 2004/0234690 A1    Nov. 25, 2004

(30) Foreign Application Priority Data

| Mar. 12, 2003 | (JP) | ............................ | 2003-067006 |
| Mar. 12, 2003 | (JP) | ............................ | 2003-067007 |
| Feb. 10, 2004 | (JP) | ............................ | 2004-033600 |

(51) Int. Cl.
    *G02F 1/1341*    (2006.01)
(52) U.S. Cl. ........................... 349/189; 349/187
(58) Field of Classification Search ................ 349/187, 349/189
    See application file for complete search history.

(56) References Cited

U.S. PATENT DOCUMENTS

| 6,331,884 | B1 * | 12/2001 | Masazumi et al. .......... 349/156 |
| 6,599,582 | B2 | 7/2003 | Kiguchi et al. |
| 6,667,795 | B2 * | 12/2003 | Shigemura ................... 349/187 |
| 6,867,840 | B2 * | 3/2005 | Hsieh et al. .................. 349/187 |
| 6,877,853 | B2 | 4/2005 | Kiguchi et al. |
| 7,114,802 | B2 | 10/2006 | Kiguchi et al. |
| 2001/0007733 | A1 | 7/2001 | Matsuyama et al. |
| 2002/0062787 | A1 * | 5/2002 | Hashizume et al. ......... 118/664 |
| 2002/0081503 | A1 * | 6/2002 | Kawase et al. ................. 430/7 |
| 2002/0167638 | A1 | 11/2002 | Byun et al. |
| 2004/0201818 | A1 * | 10/2004 | Yamamoto et al. .......... 349/187 |
| 2005/0018125 | A1 * | 1/2005 | Hiruma ....................... 349/189 |

FOREIGN PATENT DOCUMENTS

| JP | 5-281562 | 10/1993 |
| JP | 9-138410 | 5/1997 |
| JP | 10-221666 | 8/1998 |
| JP | 10-283917 | 10/1998 |
| JP | 11-204529 | 7/1999 |

(Continued)

OTHER PUBLICATIONS

Machine Translation of JP 09-138410, made of record by the applicant.*

(Continued)

*Primary Examiner*—Andrew Schechter
(74) *Attorney, Agent, or Firm*—Harness, Dickey & Pierce, P.L.C.

(57) ABSTRACT

A film forming device forms a coated film on a substrate by discharging a liquid material in the form of liquid droplets, and causing the liquid droplets to impact on the substrate at a predetermined pitch. The predetermined pitch is determined based on the diameter of the liquid droplets after impact of the liquid droplets on the substrate. Drop marks are reduced and a uniform coated film is formed on the substrate.

3 Claims, 11 Drawing Sheets

FOREIGN PATENT DOCUMENTS

| | | |
|---|---|---|
| JP | 2000-204250 | 7/2000 |
| JP | 2000-323276 | 11/2000 |
| JP | 2001-042330 | 2/2001 |
| JP | 2001-183514 | 7/2001 |
| KR | 2000-0035404 | 6/2000 |
| KR | 2001-0070396 | 7/2001 |
| KR | 2002-0086758 | 11/2002 |

OTHER PUBLICATIONS

Patent Abstracts of Japan, 09-138410 (2 pages).
Patent Abstracts of Japan, 05-281562 (2 pages).

* cited by examiner

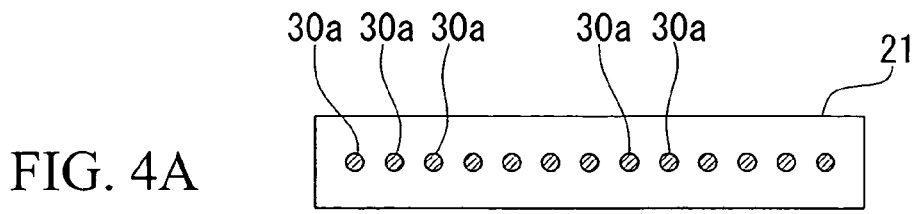
FIG. 4A
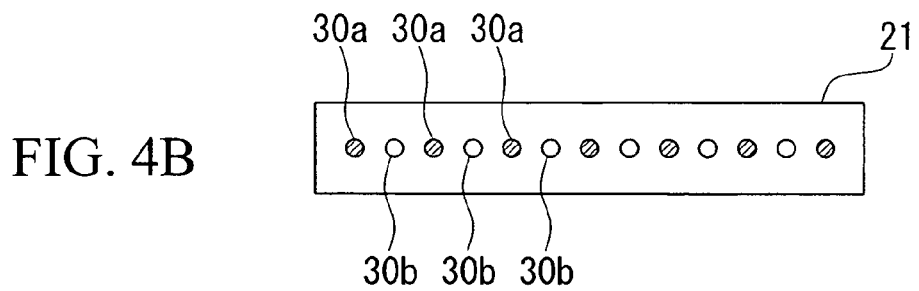
FIG. 4B
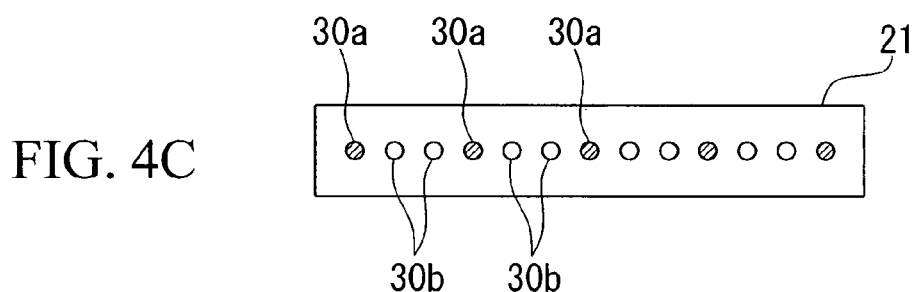
FIG. 4C
FIG. 5A
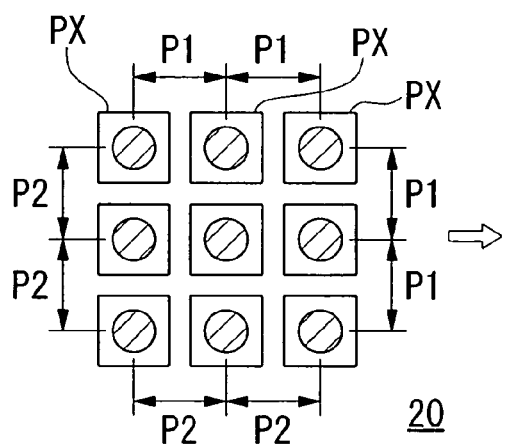
(IMMEDIATELY AFTER IMPACT)
FIG. 5B
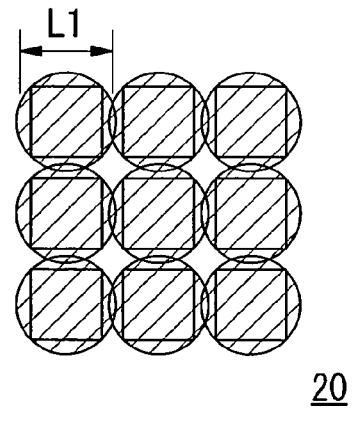
(AFTER A PREDETERMINED TIME HAS ELAPSED)

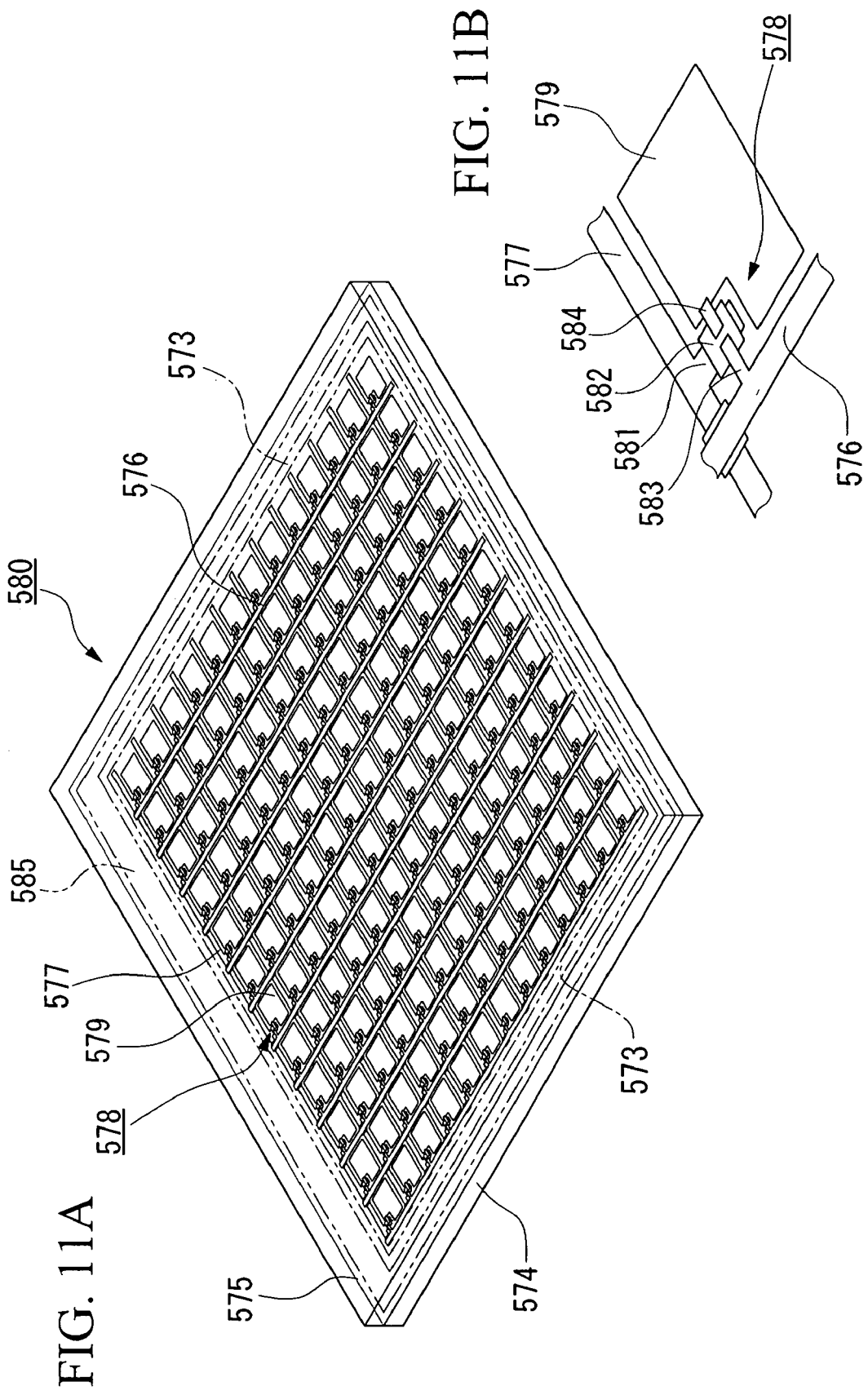

LIQUID CRYSTAL DISCHARGING METHOD, AND LIQUID CRYSTAL DISCHARGING DEVICE

BACKGROUND OF THE INVENTION

1. Field of the Invention

The present invention relates to a method for arranging a liquid material on a substrate by discharging the liquid material in the form of liquid droplets, and particularly, relates to a method for forming a film on a substrate by discharging a liquid material in the form of liquid droplets, a device using the method, a method for arranging liquid crystal on a substrate by discharging liquid crystal from a discharge unit, and a device using the method.

2. Description of the Related Art

In liquid crystal devices, for example, an alignment film is formed on a substrate for alignment of liquid crystal molecules.

Such films are formed by forming a coated film of a liquid material on a substrate followed by drying.

Known examples of methods for forming a film of a liquid material on a substrate include printing and spin coating. In addition, there is also a technology in which coated films are formed by discharging a liquid material in the form of liquid droplets and then causing the droplets to impact on the substrate at a predetermined pitch for the purpose of reducing the amount of material used (e.g., Japanese Unexamined Patent Application, First Publication No. 9-138410).

In the case of a liquid crystal device, liquid crystal arranged on a substrate is used, for example, as a part of a display control unit in a liquid crystal device.

Known examples of methods for arranging liquid crystal on a substrate include a method for discharging a predetermined amount of liquid crystal from a discharge unit such as a dispenser. In addition, known examples of methods for arranging liquid crystal on a substrate include a method in order to carry out the arrangement of liquid crystal at higher precision for arranging the liquid crystal on a substrate by discharging liquid crystal from a discharge unit in the form of liquid droplets (e.g., Japanese Unexamined Patent Application, First Publication No. 5-281562).

In the case of methods for forming a film on a substrate by discharging a liquid material in the form of liquid droplets, or methods for arranging liquid crystal on a substrate by discharging the liquid crystal in the form of liquid droplets, the peripheral edges of the liquid droplets tend to remain unevenly in the form of drop marks. This unevenness causes a deterioration of uniformity of the film thickness, and may cause a deterioration of visibility in displays such as liquid crystal devices.

BRIEF SUMMARY OF THE INVENTION

In view of the aforementioned problems, an object of the present invention is a provision of a film forming method and a film forming device for forming a uniform coated film on a substrate while reducing drop marks.

In addition, another object of the present invention is a provision of a liquid crystal arrangement method and a device using the method for uniformly arranging liquid crystal on a substrate while reducing drop marks.

In addition, another object of the present invention is a provision of a liquid crystal device and a production method thereof offering improved visibility.

In addition, another object of the present invention is a provision of electrical equipment offering improved quality.

The first aspect of the present invention is a film forming method comprising steps of:
discharging a liquid material in a form of liquid droplets; impacting the liquid droplets on a substrate at a predetermined pitch; and forming a film on the substrate, the predetermined pitch determined based on a diameter of the liquid droplets after impact of the liquid droplets on the substrate.

The diameter of the liquid droplets after impact of the liquid droplets on the substrate refers to the diameter of the liquid droplets on the substrate after a predetermined amount of time (e.g., 0-300 seconds) has elapsed after impact.

In the aforementioned film forming method, since a liquid material is discharged in the form of liquid droplets, the amount and location of the liquid material arranged on the substrate can be finely controlled, allowing the formation of a uniform coated film. In addition, since the liquid material is arranged on the substrate by finely dispersing in the form of liquid droplets, visual unevenness is inconspicuous. Moreover, in this film forming method, since the impact pitch of the liquid droplets on the substrate is determined based on the impact diameter of the liquid material on the substrate, a uniform film thickness can be obtained.

For example, a uniform film thickness can be obtained by making the aforementioned predetermined pitch roughly equal to the diameter of the liquid droplets after impact.

Here, the arrangement pitch of the liquid droplets is preferably 50% to 150%, and more preferably 80% to 120%, of the diameter of the liquid droplets after impact (to be referred to as the "impact diameter" as necessary). If the arrangement pitch of the liquid droplets is less than 50% of the impact diameter, there is the risk of drop marks becoming conspicuous due to the occurrence of interference between droplets, thereby making this undesirable. If the arrangement pitch is greater than 150% of the impact diameter, there is also the risk of drop marks becoming conspicuous due to the liquid droplets remaining in their original form on the substrate as a result of the liquid droplets not joining together, thereby making this undesirable. Drop marks can be reliably reduced by making the arrangement pitch of the liquid crystal 80% to 120% of the impact diameter.

In the aforementioned film forming method, an example of the aforementioned liquid material is a material which forms an alignment film.

In this case, drop marks on the alignment film are reduced and the uniformity of its film thickness is improved.

In addition, the viscosity of the aforementioned liquid material is preferably 2.0 mPa·s to 20 mPa·s.

If the viscosity of the liquid material is less than 2.0 mPa·s or greater than 20 mPa·s, discharge of the liquid droplets becomes unstable, thereby making this undesirable.

The surface tension of the aforementioned liquid material in this case is preferably 20mN/m to 70 mN/m.

If the surface tension of the liquid material is less than 20 mN/m or greater than 70mN/m, discharge of the liquid droplets becomes unstable, thereby making this undesirable.

In addition, in the aforementioned film forming method, a plurality of pixel regions are arranged on the substrate, and the liquid droplets are preferably made to impact at the location of the center of each of the plurality of pixel regions. As a result, the joined portions of the liquid droplets are located at the boundaries of a plurality of pixel regions, and decreases in pixel visibility caused by drop marks formed at the joined portions are inhibited.

In this case, since the diameter of the aforementioned liquid droplets after impact is roughly equal to the arrangement pitch of the aforementioned plurality of pixel regions, the arrangement pitch of the liquid droplets becomes roughly equal to the impact diameter of the liquid droplets, thereby reducing drop marks as described above.

In addition, in the aforementioned film forming method, there is preferably a lyophilic treatment step, in which the surface of the substrate is treated to be lyophilic with respect to the liquid material, prior to the aforementioned coating step.

As a result, uniformity of the film thickness is further improved.

The second aspect of the present invention is a film forming device comprising: a discharge head which discharges a liquid material in a form of liquid droplets and impacts the liquid droplets on a substrate at a predetermined pitch to form a coated film on the substrate, the predetermined pitch determined based on a diameter of the liquid droplets after impact of the liquid droplets on the substrate.

In the aforementioned film forming device, since the aforementioned film forming method can be carried out as a result of having the aforementioned constitution, the amount and location of the liquid material arranged on the substrate can be finely controlled, allowing the formation of a uniform coated film. Since the pitch at which liquid droplets impact the substrate is determined based on the impact diameter of the liquid material on the substrate, a uniform film thickness can be obtained.

For example, a uniform film thickness can be obtained by making the aforementioned predetermined pitch roughly equal to the diameter of the liquid droplets after impact.

In addition, in the aforementioned film forming device, a nozzle which discharges the aforementioned liquid crystal in the form of liquid droplets is formed on the aforementioned discharge head, and the surface of the periphery of the nozzle on the discharge head is preferably treated so as to have a predetermined contact angle with respect to the liquid material.

As a result, the discharge of liquid droplets is stabilized.

In this case, by making the aforementioned predetermined contact angle 30° to 170°, the discharge state of the liquid droplets can be reliably stabilized.

In addition, in the aforementioned film forming device, a plurality of pixel regions should be arranged on the substrate, and a drive system should be provided that aligns the impact locations of the liquid droplets with the respective locations of the plurality of pixel regions by moving the nozzle and substrate relative to each other. As a result, the joined portions of the liquid droplets are located at the boundaries of a plurality of pixel regions, and decreases in pixel visibility caused by drop marks formed at the joined portions are inhibited.

The third aspect of the present invention is a liquid crystal device comprising an alignment film provided using a film forming device according to the first aspect of the present invention.

Since an alignment film is formed using the aforementioned film forming device, this liquid crystal device makes it possible to reduce alignment unevenness of the liquid crystal and improve visibility with minimum unevenness in film thickness.

The fourth aspect of the present invention is an electronic equipment comprising a liquid crystal device according to the aforementioned liquid crystal device.

In this electronic equipment, quality is improved due to being provided with a liquid crystal device offering high visibility.

The fifth aspect of the present invention is a liquid crystal arrangement method for discharging liquid crystal from a discharge unit to arrange the liquid crystal on a substrate, in which the discharge unit comprises a plurality of nozzles for discharging the liquid crystal in a form of liquid droplets, comprising: determining an arrangement pitch of the liquid droplets on the substrate based on a diameter of the liquid droplets after impact of the liquid droplets on the substrate.

Here, the diameter of the liquid droplets after impact of the liquid droplets on the substrate refers to the diameter of the liquid droplets on the substrate after a predetermined amount of time (e.g., 0-300 seconds) has elapsed after impact.

In the aforementioned liquid crystal arrangement method, since liquid crystal is discharged in the form of liquid droplets, the amount and location of the liquid crystal arranged on the substrate can be finely controlled enabling a uniform arrangement of liquid crystal. In addition, since liquid crystal is arranged on the substrate finely dispersed in the form of liquid droplets, drop marks are also finely dispersed making them inconspicuous. Consequently, the present invention is preferably applied for increasing the precision and reducing the size of devices equipped with liquid crystal. Moreover, in this arrangement method, since the pitch at which liquid droplets are arranged on the substrate is determined based on the diameter of liquid droplets after impact of the liquid droplets on the substrate, drop marks can be reduced.

For example, by making the arrangement pitch of the aforementioned liquid droplets roughly equal to the diameter of the liquid droplets after impact, when adjacent liquid droplets join to form a liquid crystal film on the substrate, the size of the joined portions can be reduced thereby reducing drop marks.

Here, the aforementioned arrangement pitch of the liquid droplets is preferably 50% to 150%, and more preferably 80% to 120%, of the diameter of the liquid droplets after impact (to be referred to as the "impact diameter" as necessary). If the arrangement pitch of the liquid droplets is less than 50% of the impact diameter, there is the risk of drop marks becoming conspicuous due to the occurrence of interference between droplets, thereby making this undesirable. If the arrangement pitch is greater than 150% of the impact diameter, there is also the risk of drop marks becoming conspicuous due to the liquid droplets remaining in their original form on the substrate as a result of the liquid droplets not joining together, thereby making this undesirable. Drop marks can be reliably reduced by making the arrangement pitch of the liquid crystal 80% to 120% of the impact diameter.

In addition, in the aforementioned liquid crystal arrangement method, in the case of forming a plurality of pixel regions composed of a plurality of pixels on the aforementioned substrate, the aforementioned liquid droplets are preferably coated onto each of the plurality of pixel regions. As a result, the joined portions of the liquid droplets are located at the boundaries of a plurality of pixel regions, and decreases in pixel visibility caused by drop marks formed at the joined portions are inhibited. In this case, an example of a pixel region is a specific pixel region within a single chip on a mother board.

In this case, by making the diameter of the aforementioned liquid droplets after impact to be roughly equal to the arrangement pitch of the aforementioned plurality of pixel regions, the arrangement pitch of the liquid droplets becomes roughly equal to the impact diameter of the liquid droplets, thereby reducing drop marks as described above.

The sixth aspect of the present invention is a liquid crystal arrangement device comprising: a discharge unit for discharging liquid crystal to arrange the liquid crystal on a substrate, the discharge unit comprising a plurality of nozzles which discharge liquid crystal in a form of liquid droplets, and an interval between the plurality of nozzles is determined based on a diameter of the liquid droplets after impact of the liquid droplets on the substrate.

In the aforementioned liquid crystal arrangement device, since the aforementioned liquid crystal arrangement method can be carried out as a result of having the aforementioned constitution, the amount and location of the liquid crystal arranged on the substrate can be finely controlled, allowing a uniform arrangement of liquid crystal. In addition, since the interval between the plurality of nozzles is determined based on the diameter of the liquid droplets after impact of the liquid droplets on the substrate (impact diameter), drop marks can be reduced.

For example, by making the interval between the plurality of nozzles roughly equal to the diameter of the liquid droplets after impact, the arrangement pitch of the liquid droplets on the substrate becomes roughly equal to the diameter of the liquid droplets after impact, and when adjacent liquid droplets join to form a liquid crystal film on the substrate, the size of the joined portions can be reduced, thereby reducing drop marks.

In addition, in the aforementioned liquid crystal arrangement device, a plurality of pixel regions should be arranged on the substrate, and a drive system should be provided which aligns the impact locations of the liquid droplets with the locations of the centers of the each of the plurality of pixel regions by moving the plurality of nozzles and substrate relative to each other. As a result, the joined portions of the liquid droplets are located at the boundaries of a plurality of pixel regions, and decreases in pixel visibility caused by drop marks formed at the joined portions are inhibited.

In this case, by making the diameter of the liquid droplets after impact to be roughly equal to the arrangement pitch of the plurality of pixel regions, the liquid droplet arrangement pitch becomes roughly equal to the impact diameter of the liquid droplets, thereby reducing drop marks as described above.

The seventh aspect of the present invention is a liquid crystal device comprising liquid crystal arranged using a liquid crystal arrangement device according to the aforementioned liquid crystal arrangement device.

In this liquid crystal device, since liquid crystal is arranged using the aforementioned liquid crystal arrangement device, drop marks are inconspicuous and visibility is improved.

The eighth aspect of the present invention is an electronic device electronic device comprising a liquid crystal device according to the aforementioned liquid crystal device.

In this electronic equipment, quality is improved as a result of being provided with a liquid crystal device having high visibility.

The ninth aspect of the present invention is a liquid crystal device production method comprising: forming an alignment film on a substrate by an ink jet process; and coating liquid crystal onto the substrate on which the alignment film is formed by the ink jet process.

In addition, the tenth aspect of the present invention is a liquid crystal device production method comprising: forming a color filter on a substrate by an ink jet process; forming an alignment film on the substrate on which the color filter is formed by the ink jet process; and forming liquid crystal on one of a pair of substrates by the ink jet process so as to form therebetween.

BRIEF DESCRIPTION OF THE DRAWINGS

FIG. 4A is a schematic diagram showing the discharge surface of a liquid discharge head.

FIG. 4B is a schematic diagram showing the discharge surface of a liquid discharge head.

FIG. 4C is a schematic diagram showing the discharge surface of a liquid discharge head.

FIG. 5A is a diagram showing a liquid material (or liquid crystal) of an alignment film arranged on a substrate for actual treatment.

FIG. 5B is a diagram showing a liquid material (or liquid crystal) of an alignment film arranged on a substrate for actual treatment.

FIG. 11A is a perspective view of the overall constitution of the liquid crystal display device in an example of an active matrix type of liquid crystal device (liquid crystal display device) which uses TFT for the switching element.

FIG. 11B is an enlarged view of a single pixel in the liquid crystal display shown in FIG. 11A.

DETAILED DESCRIPTION OF THE INVENTION

The following provides embodiments according to the present invention with reference to the drawings.

Figure 1:
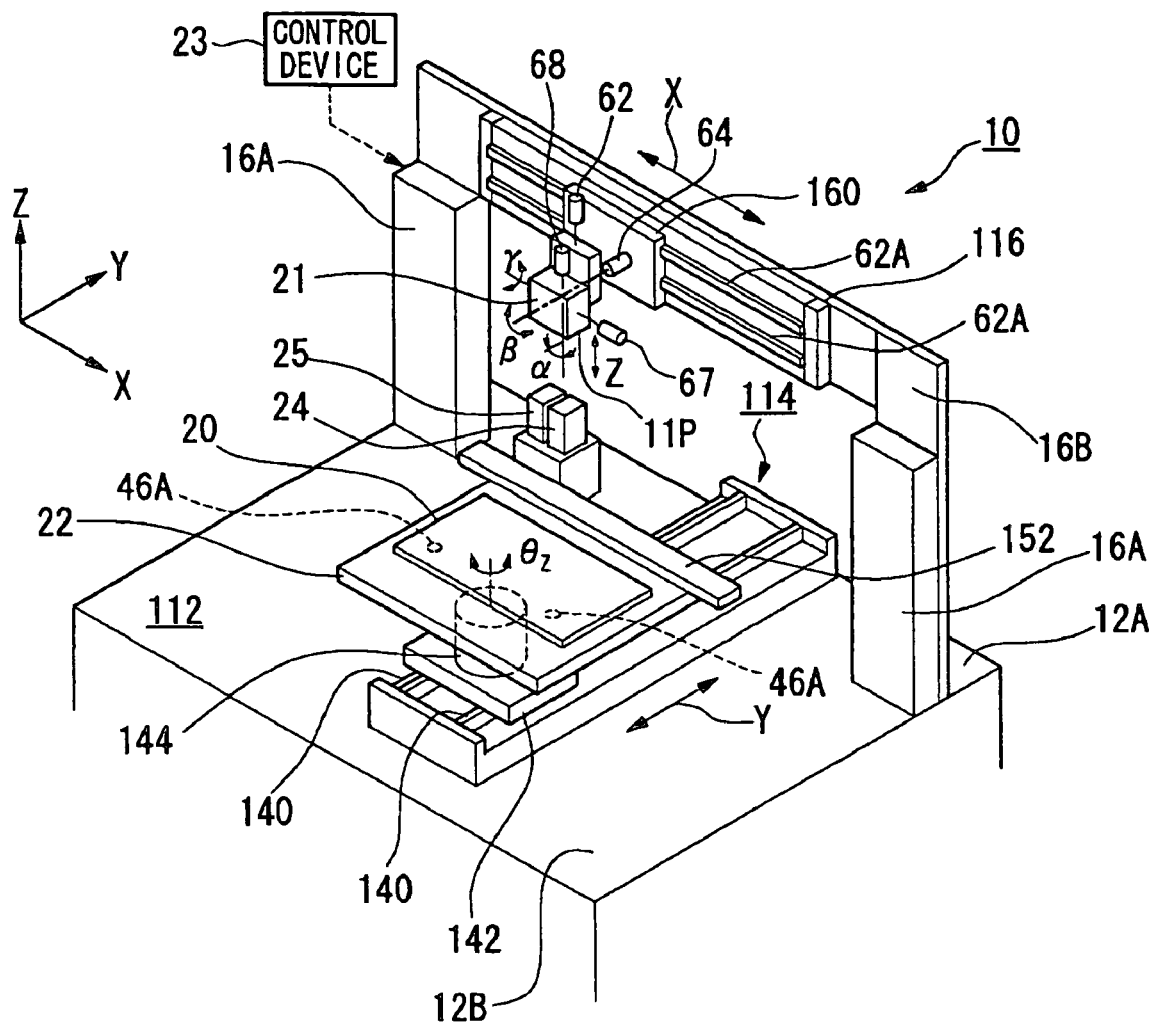
FIG. 1 is a schematic diagram showing an embodiment of the film forming device (liquid crystal arrangement device) according to the present invention.

FIG. 1 schematically shows one example of an embodiment of a film forming device according to the present invention.

Furthermore, the film forming device shown in FIG. 1 is preferably applied as a liquid crystal arrangement device of the present invention as described later.

In FIG. 1, film forming device 10 is equipped with a base 112, substrate stage 22 provided on base 112 and supporting substrate 20, first movement device (movement device) 114 provided between base 112 and substrate stage 22 and movably supporting substrate stage 22, liquid discharge head 21 capable of discharging a treatment liquid onto substrate 20 supported by substrate stage 22, second movement device 116 movably supporting liquid discharge head 21, and control device 23 controlling a discharge operation of liquid droplets of liquid discharge head 21. Moreover, film forming device 10 comprises an electronic balance (not shown) as a weight measurement device provided on base 112, capping unit 25, and cleaning unit 24. In addition, the operation of film forming device 10 comprising first movement device 114 and second movement device 116 is controlled by control device 23.

First movement device 114 is installed on base 112, and is positioned along the Y direction. Second movement device 116 is attached upright from base 112 using support columns 16A at rear section 12A of base 112. The X direction (the second direction) of second movement device 116 is perpendicular to the Y direction (the first direction) of first movement device 114. Here, the Y direction is the direction along the direction of front section 12B and rear section 12A of base 112. In contrast, the X direction is the direction along the left and right directions of base 112. The X direction and Y direction are respectively parallel to base 112. In addition, the Z direction is the direction perpendicular to the X direction and the Y direction.

First movement device 114 is composed by, for example, a linear motor, and is provided with guide rails 140 and a slider 142 movably provided along these guide rails 140. Slider 142 of this linear motor type first moving device 114 can be positioned by moving in the Y direction along guide rails 140.

In addition, slider 142 is provided with motor 144 for rotating about the Z axis (θZ). This motor 144 is, for example, a direct drive motor, and a rotor of motor 144 is fixed on substrate stage 22. As a result, by supplying power to motor 144, the rotor and substrate stage 22 rotate along the θZ direction, making it possible to index (rotation index) substrate stage 22. Namely, first movement device 114 is able to move substrate stage 22 in the Y direction (the first direction) and the θZ direction.

Substrate stage 22 holds substrate 20 and positions it at a predetermined location. In addition, substrate stage 22 has a suction holding device (not shown). By activating this suction holding device, substrate 20 is sucked and held onto substrate stage 22 through holes 46A in substrate stage 22.

Second movement device 116 is composed of, for example, a linear motor, and is provided with column 16B fixed to support columns 16A, guide rails 62A supported by this column 16B, and slider 160 movably supported in the X direction along guide rails 62A. Slider 160 can be positioned by moving in the X direction along guide rails 62A, and liquid discharge head 21 is attached to slider 160.

Liquid discharge head 21 comprises motors 62, 64, 67 and 68 as oscillating positioning devices. When motor 62 is operated, liquid discharge head 21 can be positioned by vertically moving along the Z axis. This Z axis is in the direction (vertical direction) respectively perpendicular to the X axis and Y axis. When motor 64 is operated, liquid discharge head 21 can be positioned by oscillating along the β direction about the Y axis. When motor 67 is operated, liquid discharge head 21 can be positioned by oscillating in the γ direction about the X axis. When motor 68 is operated, liquid discharge head 21 can be positioned by oscillating in the α direction about the Z axis. Namely, second movement device 116 movably supports liquid discharge head 21 in the X direction (the first direction) and Z direction, and also second movement device 116 movably supports liquid discharge head 21 in the θX direction, θY direction, and θZ direction.

In this manner, since liquid discharge head 21 shown in FIG. 1 can be positioned by linearly moving in the direction of the Z axis on slider 160, and can be positioned by oscillating along α, β, and γ. The location or orientation of liquid droplet discharge surface 11P of liquid discharge head 21 can be accurately controlled relative to substrate 20 on substrate stage 22. Furthermore, a plurality of nozzles that discharge liquid droplets are provided in the liquid droplet discharge surface 11P of liquid discharge head 21.

Liquid discharge head 21 discharges a liquid material (resist) from nozzles using a so-called liquid discharge method (liquid droplet discharge method). Various known methods can be applied as liquid discharging methods, examples of which include a piezo method in which ink is discharged using a piezo element as a piezoelectric element, and a method in which a liquid material is discharged by bubbles generated by heating the liquid material. Among these methods, since the piezo method does not involve the application of heat to the liquid material, it has the advantage that there has no effect on the composition of the material and the like. Furthermore, the piezo method is used in the present example.

Figure 2:
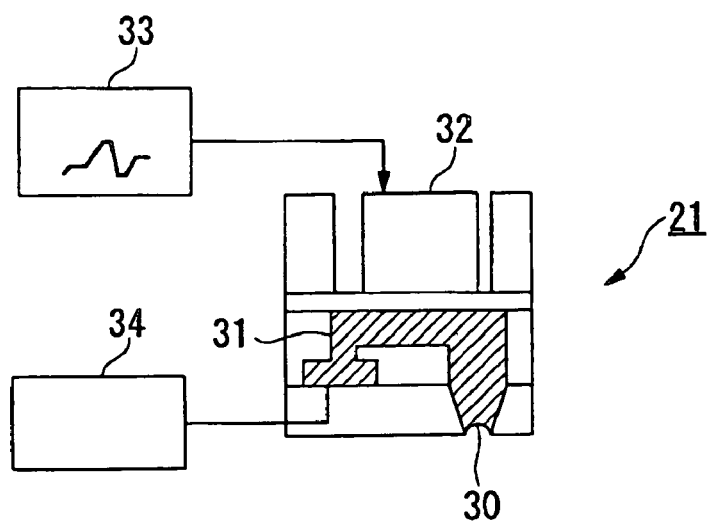
FIG. 2 is a diagram for explaining the principle by which a liquid material is discharged by a piezo method.

FIG. 2 is a diagram for explaining the principle by which a liquid material is discharged by the piezo method. In FIG. 2, piezo element 32 is installed adjacent to liquid chamber 31 which houses a liquid material. Liquid material is supplied to liquid chamber 31 by means of a liquid material supply system 34 which includes a material tank housing the liquid material. Piezo element 32 is connected to drive circuit 33, and a voltage is applied to piezo element 32 by means of this drive circuit 33. Liquid chamber 31 is deformed and liquid material is discharged from nozzle 30 as a result of deforming piezo element 32. At this time, the amount of distortion of piezo element 32 can be controlled by changing the value of the applied voltage, and the rate of distortion of piezo element 32 by changing the frequency of the applied voltage. Namely, in liquid discharge head 21, discharge of liquid material from nozzle 30 is controlled by controlling the voltage applied to piezo element 32.

In FIG. 1, an electronic balance (not shown) receives, for example, 5000 liquid droplets from the nozzles of liquid discharge head 21 to measure and manage the weight of individual droplets discharged from the nozzles of liquid discharge head 21. By dividing the weight of these 5000 liquid droplets by the number 5000, the electronic balance is able to accurately measure the weight of a single liquid droplet. The amount of liquid droplets discharged from liquid discharge head 21 can then be optimally controlled based on the measured weight of a single liquid droplet.

Cleaning unit 24 is able to clean the nozzles of liquid discharge head 21 and the like periodically or when desired during a device production process or during standby. Capping unit 25 covers the liquid droplet discharge surface 11P with a cap during standby when devices are not being produced to prevent liquid droplet discharge surface 11P of liquid discharge head 21 from drying.

Liquid discharge head 21 can be selectively positioned over the electronic balance, cleaning unit 24, or capping unit 25 by being moved in the X direction by second movement device 116. In other words, if liquid discharge head 21 is moved to the electronic balance, the weight of the liquid droplets can be measured even during the course of device production work. In addition, liquid discharge head 21 can be cleaned if liquid discharge head 21 is moved over cleaning unit 24. A cap is attached to the liquid droplet discharge surface 11P of liquid discharge head 21 to prevent drying if liquid discharge head 21 is moved over capping unit 25.

In other words, the electronic balance, cleaning unit 24, and capping unit 25 are arranged on the rear end of base 112 and directly beneath a movement path of liquid discharge head 21 separated from substrate stage 22. Since the supply and removal of substrate 20 to and from substrate stage 22 are carried out at the front end of base 112, this work is not obstructed by the electronic balance, cleaning unit 24, or capping unit 25.

As shown in FIG. 1, a spare discharge area (spare discharge region) 152 is provided separated from cleaning unit 24 at a portion of substrate stage 22 other than that which supports substrate 20 to enable sacrifice discharge or proof discharge of liquid droplets (spare discharge) by liquid discharge head 21. As shown in FIG. 1, this spare discharge area 152 is provided along the X direction at the rear end of substrate stage 22. This spare discharge area 152 is fixed to substrate stage 22, and is composed of a receiving member having a concave cross-section that opens upward, and an absorbing material which is detachably installed in the concave portion of the receiving member and absorbs discharged liquid droplets.

Various types of substrates can be used as substrate 20, examples of which include a glass substrate, silicon substrate, quartz substrate, ceramic substrate, metal substrate, plastic substrate, and plastic film substrate. In addition, a semiconductor film, metal film, dielectric film, organic film, and the like may be formed as a base layer on the surface of these substrates composed of various materials. In addition, examples of the aforementioned plastic include polyolefines, polyesters, polyacrylates, polycarbonates, polyether sulfones, and polyether ketones.

The following provides an explanation of the film forming method according to the present invention.

Figure 3A:
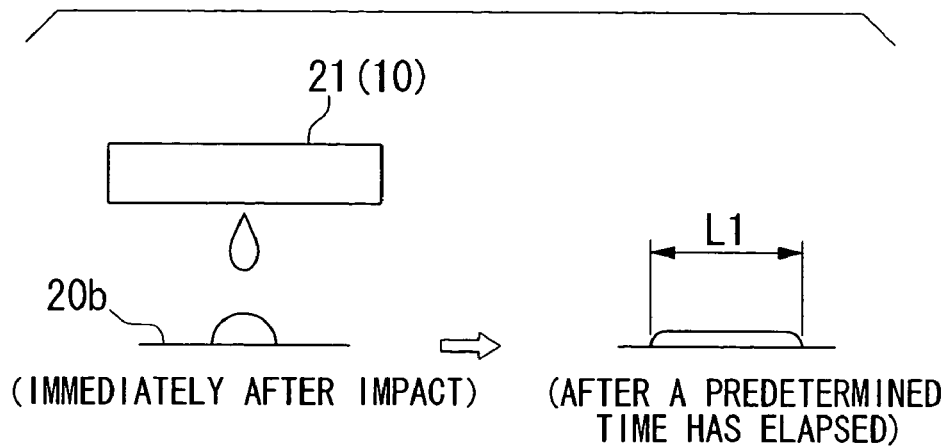
FIG. 3A is a diagram showing an example of forming an alignment film (or arranging liquid crystal) on a substrate using a film forming device.
Figure 3B:
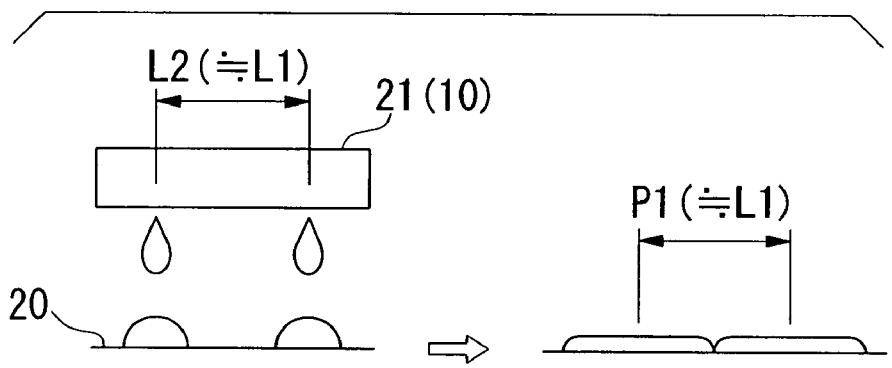
FIG. 3B is a diagram showing an example of forming an alignment film (or arranging liquid crystal) on a substrate using a film forming device.
Figure 3C:
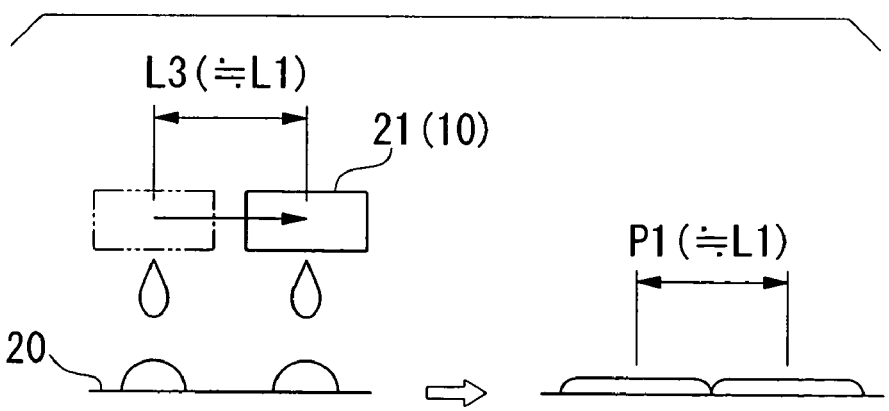
FIG. 3C is a diagram showing an example of forming an alignment film (or arranging liquid crystal) on a substrate using a film forming device.

FIGS. 3A through 3C show an example a method for forming an alignment film on substrate 20 using film forming device 10 having the aforementioned constitution.

First, lyophilic treatment is performed on the surface of substrate 20 for the liquid material of the alignment film (lyophilic treatment step).

Examples of lyophilic treatment include the atmospheric pressure plasma method, UV treatment method, and organic thin film method (decane film, polyethylene film). In the plasma method, the surface of a target object is lyophilized or activated by irradiating with oxygen in a plasma state. As a result, the wettability of the surface of substrate 20 improves (the contact angle of the surface of substrate 20 becomes, for example, 20° or less after treatment as opposed to being 70° before treatment), thereby improving the uniformity of the coated film as described later.

Next, the liquid material for the alignment film is impacted onto substrate 20 at a predetermined pitch in the form of liquid droplets, forming a coated film on substrate 20 (coating step).

A liquid material containing a solid component such as polyimide (solid component concentration: 3-5%) and an organic solvent such as gamma-butyrolactone is used for the liquid material of an alignment material.

In addition, the viscosity of the liquid material of the alignment film in this case is preferably 2.0 to 20 mPa·s. If the viscosity of the liquid material is less than 2.0 mPa·s, the meniscus of the liquid material within the nozzles of the liquid discharge head does not stabilize, thereby resulting in susceptibility to instability of the discharge of liquid droplets, and making this undesirable. In addition, if the viscosity of the liquid material exceeds 20mPa·s, the supply of material to the liquid chamber of the liquid discharge head cannot be carried out smoothly, thereby also resulting in susceptibility to instability of the discharge of liquid droplets, and making this undesirable.

In addition, the surface tension of the liquid material of the alignment film in this case is preferably 20 to 70 mN/m. If the surface tension of the liquid material is less than 20 mN/m, wettability of the liquid material on the discharge surface of the liquid discharge head increases, thereby resulting in curvature in the flight path when the liquid droplets are dispersed and causing instability in the discharge of liquid droplets, and making this undesirable. In addition, if the surface tension of the liquid material exceeds 70 mN/m, the meniscus of the liquid material within the nozzles of the liquid discharge head does not stabilize, thereby resulting in susceptibility to instability of the discharge of liquid droplets, and making this undesirable.

In the film forming method of the present example, as shown in FIGS. 3B and 3C, the liquid material of the alignment film is discharged in the form of liquid droplets from nozzles provided in liquid discharge head 21, and those liquid droplets are made to impact on substrate 20. By then repeating this operation of discharging liquid droplets, a coated film of an alignment film is formed on substrate 20.

At this time, the arrangement pitch of the liquid droplets is determined in advance based on the diameter of the liquid droplets after impact of the liquid droplets on substrate 20. In other words, as shown in FIG. 3A, prior to arranging the liquid droplets, the diameter of the liquid droplets on substrate 20 after impact of the liquid droplets on substrate 20 (impact diameter) is measured, and the arrangement pitch of the liquid droplets is then determined based on those measurement results.

Here, measurement of the impact diameter of the liquid droplets is not limited to a method which uses substrate 20 for actual treatment, but measurement may be carried out indirectly by using an object for which at least a portion of the surface has the same material and characteristics of substrate 20 for actual treatment as a measurement target. In this case, as shown, for example, in FIG. 3A, the liquid material should be discharged in the form of liquid droplets from liquid discharge head 21 onto the surface of substrate 20b having the same characteristics as substrate 20 for actual treatment, and the diameter of the liquid droplets that spread out on substrate

20b (impact diameter L1) should then be measured after a predetermined time has elapsed after impact (e.g., 0-300 seconds).

In this example, as shown in FIGS. 3B and 3C, liquid material is discharged in the form of liquid droplets from liquid discharge head 21 onto substrate 20 so that the interval between liquid droplets arranged on substrate 20 (arrangement pitch P1) is roughly equal to the aforementioned impact diameter L1 of the liquid droplets.

At this time, the arrangement pitch P1 of the liquid droplets can be controlled according to the interval between the discharge nozzles in liquid discharge head 21 and the relative movement distance of liquid discharge head 21 and substrate 20.

For example, as shown in FIG. 3B, by making an interval L2 between the discharge nozzles of liquid discharge head 21 roughly equal to the impact diameter L1 of the liquid droplets, liquid droplets are arranged on substrate 20 at a pitch P1 which is roughly equal to the aforementioned impact diameter L1.

In addition, as shown in FIG. 3C, by relatively moving liquid discharge head 21 and substrate 20 by a distance (L3) roughly equal to the aforementioned impact diameter L1 each time liquid droplets are discharged from liquid discharge head 21 onto substrate 20, liquid droplets are arranged on substrate 20 at a pitch P1 which is roughly equal to the aforementioned impact diameter L1.

Here, the interval L2 between the discharge nozzles of liquid discharge head 21 can be controlled by selecting those nozzles to be used among the plurality of nozzles formed in liquid discharge head 21.

FIGS. 4A through 4C schematically show the discharge surface of liquid discharge head 21.

As shown in FIG. 4A, a plurality of nozzles 30 are formed in a row in liquid discharge head 21, and the interval between the nozzles from which liquid droplets are discharged is minimized by using all of the nozzles 30.

In contrast, as shown in FIG. 4B or FIG. 4C, by using every other nozzle or every two nozzles (or more) as nozzles used to discharge liquid droplets (nozzles used for discharge are indicated with reference symbol 30a, while those not used for discharge are indicated with reference symbol 30b) among the plurality of nozzles 30, the interval between nozzles which discharge liquid droplets can be changed. Furthermore, in the case of the discharge accuracy differs depending on the number of nozzles used among the plurality of nozzles, the number of nozzles used may be selected in consideration of that discharge accuracy.

In addition, the peripheral surfaces of the nozzles of liquid discharge head 21 are preferably treated to have a predetermined contact angle, and specifically 30° to 170°, relative to the liquid material. This surface treatment can be carried out by subjecting the discharge surface of liquid discharge head 21 to lyophobic or lyophilic treatment. Various known methods can be employed for lyophobic treatment, examples of which include a plasma treatment method (plasma polymerization) and a eutectoid plating method, and also a method imparting lyophobic property with a gold-thiol, and a method imparting lyophobic property with FAS (fluoroalkylsilane). Among these, the plasma treatment method has the advantage of facilitating easy control in addition to being able to impart various characteristics to the surface targeted for treatment depending on selection of the raw material and the like. In addition, the method for lyophilic treatment is the same as described above.

In this case, if the contact angle is less than 30°, wettability on the nozzle surfaces increases causing the discharge of liquid droplets to become unstable, thereby making this undesirable. In addition, if the contact angle exceeds 170°, the meniscus of the liquid material within the nozzles of the liquid discharge head does not stabilize, thereby resulting in susceptibility to instability of the discharge of liquid droplets, and making this undesirable.

FIGS. 5A and 5B show the arrangement of liquid material of the alignment film on substrate 20 for actual treatment based on the aforementioned film forming method. FIG. 5A shows the state immediately after arrangement of liquid droplets, and FIG. 5B shows the state after a predetermined time has elapsed.

As shown in FIGS. 5A and 5B, the liquid droplets spread out on substrate 20 after impact onto substrate 20, and adjacent liquid droplets then join together resulting in the formation of an alignment film on substrate 20.

In the present example, as described above, liquid droplets are arranged on substrate 20 at an arrangement pitch P1 that is roughly equal to the impact diameter L1 of the liquid droplets. Consequently, when adjacent liquid droplets join, the size of the joined portion becomes smaller. Namely, since the impact diameter of the liquid droplets is roughly the same as the arrangement pitch of the liquid droplets, the spread of the liquid droplets after they have joined is smaller, making it difficult for the joined portion to increase in size. In contrast, if the impact diameter of the liquid droplets is excessively large as compared with the arrangement pitch of the liquid droplets, the joined liquid droplets further spread out, the material of adjacent liquid droplets ends up mixing, and the size of the joined portion increases. In addition, if the impact diameter of the liquid droplets is excessively small as compared with the arrangement pitch of the liquid droplets, liquid droplets do not join and the peripheral edges of the liquid droplets tend to remain as is in the form of drop marks. By allowing liquid droplets to join and restricting the size of their joined portions to a small size as in the present example, drop marks can be reduced. As a result, this film forming method makes it possible to achieve a uniform film thickness.

Here, an alignment film was formed on a substrate based on the aforementioned film forming method.

The discharge conditions consisted of an impact diameter of 96 μm and liquid droplet weight of 13 ng/dot.

At this time, uniformity of the coated film thickness was investigated by changing the arrangement pitch of the droplets to 40 μm, 55 μm, 96 μm, 110 μm, and 141 μm.

As a result, the film thickness uniformity was ±34% when the arrangement pitch of the liquid droplets was 40 μm, ±25% for an arrangement pitch of 55 μm, ±4% for an arrangement pitch of 96 μm, ±10% for an arrangement pitch of 110 μm, and ±14% for an arrangement pitch of 114 μm.

On the basis of these results, the arrangement pitch of the liquid droplets is preferably 50% to 150%, and more preferably 80% to 120%, of the liquid droplet impact diameter. If the arrangement pitch of the liquid droplets is less than 50% of the impact diameter, there is the risk of drop marks becoming conspicuous due to the occurrence of interference between liquid droplets, thereby making this undesirable. If the arrangement pitch of the liquid droplets is more than 150% of the impact diameter, the liquid droplets do not join, resulting in the risk of drop marks becoming conspicuous due to the liquid droplets remaining in their original form on the substrate, thereby making this undesirable. Drop marks can therefore be reliably reduced by making the arrangement pitch of liquid crystal 80% to 120% of the impact diameter.

In addition, a plurality of pixel regions PX are arranged on substrate 20 in this example, and liquid droplets are made to impact at the locations of the centers of each of the plurality of pixel regions PX. Consequently, the joined portions of the liquid droplets are located at the boundaries (e.g., the bank portions) of the plurality of pixel regions PX, and decreases in visibility of the pixels caused by drop marks forming at the joined portions are inhibited. Namely, even if drop marks of liquid droplets occur at the joined portions, since those drop marks are located in non-display regions, decreases in visibility are inhibited.

In this case, by making the diameter L1 of the liquid droplets after impact to be roughly equal to the arrangement pitch P2 of the plurality of pixel regions PX, the arrangement pitch P1 of the liquid droplets becomes roughly equal to the impact diameter L1 of the liquid droplets, thereby reliably reducing drop marks for the same reason as described above.

Next, an explanation is provided of the liquid crystal arrangement method of the present invention.

In the liquid crystal arrangement method of the present example, a predetermined amount of liquid crystal is quantitatively arranged on substrate 20 using film forming device 10 having the aforementioned constitution for the liquid crystal arrangement device.

The following provides an explanation of an example of a method for quantitative arrangement of a predetermined amount of liquid crystal on substrate 20 with reference to the previously indicated FIGS. 3A through 3C FIGS. 4A through 4C and FIGS. 5A and 5B.

In the present example, FIGS. 3A through 3C show an example of a method for quantitatively arranging a predetermined amount of liquid crystal on substrate 20 using film forming device (liquid crystal arrangement device) 10 having the aforementioned constitution.

In the liquid crystal arrangement method of the present example, as shown in FIGS. 3B and 3C, liquid crystal is discharged in the form of liquid droplets from nozzles provided in liquid discharge head 21 and made to impact on substrate 20. By repeating this operation of discharging liquid droplets, a predetermined amount of liquid crystal is arranged on substrate 20.

At this time, the arrangement pitch of the liquid droplets is determined in advance based on the diameter of the liquid droplets after impact of the liquid droplets on substrate 20. In other words, as shown in FIG. 3A, prior to arranging the liquid crystal, the diameter of the liquid droplets after impact of the liquid droplets on substrate 20 (impact diameter) is measured, and the arrangement pitch of the liquid droplets is then determined based on those measurement results.

Here, measurement of the impact diameter of the liquid droplets is not limited to a method using substrate 20 for actual treatment, but measurement may be carried out indirectly by using an object for which at least a portion of the surface has the same material and characteristics of substrate 20 for actual treatment as the measurement target. In this case, as shown, for example, in FIG. 3A, liquid crystal should be discharged in the form of liquid droplets from liquid discharge head 21 onto the surface of a substrate 20b having the same characteristics as substrate 20 for actual treatment, and the diameter of the liquid droplets which spread out on substrate 20b (impact diameter L1) should then be measured after a predetermined time has elapsed after impact (e.g., 0-300 seconds).

In this example, as shown in FIGS. 3B and 3C, liquid crystal is discharged in the form of liquid droplets from liquid discharge head 21 onto substrate 20 so that the interval between liquid droplets arranged on substrate 20 (arrangement pitch L1) is roughly equal to the aforementioned impact diameter L1 of the liquid droplets.

At this time, the arrangement pitch P1 of the liquid droplets can be controlled according to the interval between the discharge nozzles in liquid discharge head 21 and the relative movement distance of liquid discharge head 21 and substrate 20.

For example, as shown in FIG. 3B, by making the interval L2 between the discharge nozzles of liquid discharge head 21 roughly equal to the impact diameter L1 of the liquid droplets, liquid droplets are arranged on substrate 20 at a pitch P1 that is roughly equal to the aforementioned impact diameter L1.

In addition, as shown in FIG. 3C, by relatively moving liquid discharge head 21 and substrate 20 by a distance (L3) roughly equal to the aforementioned impact diameter L1 each time liquid droplets are discharged from liquid discharge head 21 onto substrate 20, liquid droplets are arranged on substrate 20 at a pitch P1 which is roughly equal to the aforementioned impact diameter L1.

Here, interval L2 between the discharge nozzles of liquid discharge head 21 can be controlled by, for example, selecting those nozzles to be used among the plurality of nozzles formed in liquid discharge head 21.

As described above, FIGS. 4A through 4C schematically show the discharge surface of liquid discharge head 21.

As shown in FIG. 4A, a plurality of nozzles 30 are formed in a row in liquid discharge head 21, and the interval between the nozzles which discharge liquid droplets is minimized by using all of nozzles 30.

In contrast, as shown in FIG. 4B or FIG. 4C, by using every other nozzle or every two nozzles (or more) as nozzles used to discharge liquid droplets (nozzles used for discharge are indicated with reference symbol 30a, while those not used for discharge are indicated with reference symbol 30b) among the plurality of nozzles 30, the interval between nozzles which discharge liquid droplets can be changed. Furthermore, in the case of the discharge accuracy differs depending on the number of nozzles used among the plurality of nozzles, the number of nozzles used may be selected in consideration of the discharge accuracy.

In addition, during discharge of liquid crystal from liquid discharge head 21, the drive voltage and drive frequency applied to piezo element 32 shown in FIG. 2 are preferably optimized.

Figure 6:
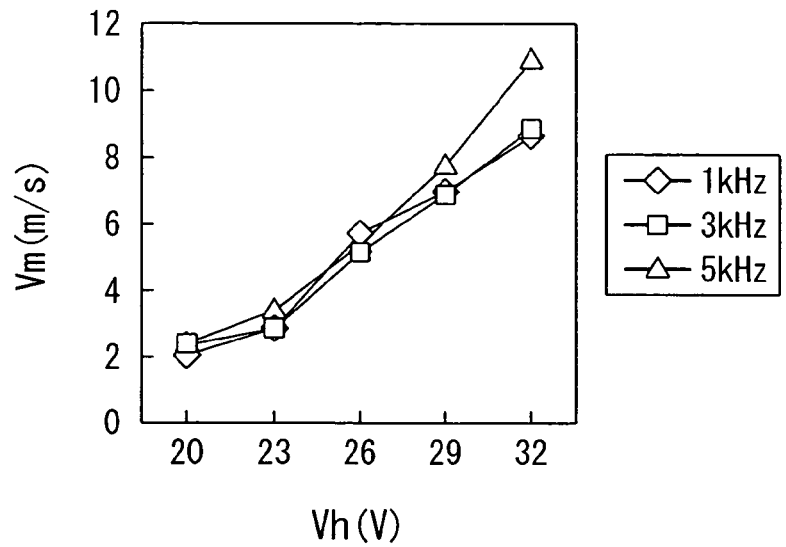
FIG. 6 is a graph showing one example of the manner in which the discharge velocity (flying velocity) Vm (m/s) of liquid droplets changes when the drive voltage Vh (V) is changed in a liquid discharge head.

The graph shown in FIG. 6 shows one example of the manner in which the discharge velocity (flying velocity) Vm (m/s) of liquid droplets changes when the drive voltage Vh (V) is changed in liquid discharge head 21.

In the example shown in FIG. 6, the drive voltage is preferably from 20 V to less than 32 V. If the drive voltage is less than 20 V, the discharge velocity slows and the flying state of the liquid droplets becomes unstable, thereby making this undesirable. In addition, if the drive voltage is 32 V or higher, the discharge velocity becomes somewhat fast, causing the flying state of the liquid droplets to become unstable, and making this undesirable as well. Furthermore, the amount of ink discharged per dot and the ink velocity are changed by changing the value of drive voltage.

Figure 7:
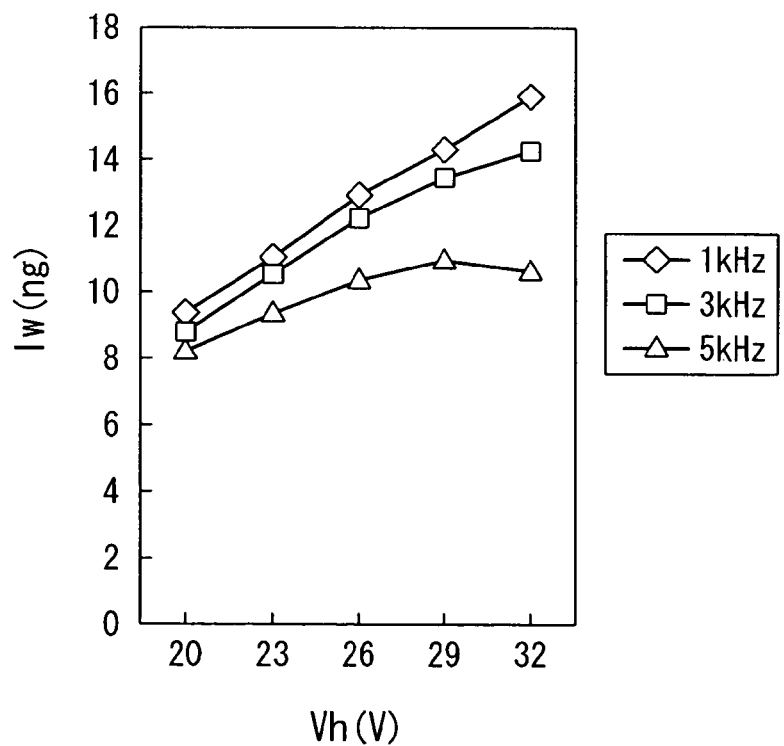
FIG. 7 is a graph showing one example of the manner in which the relationship between drive voltage Vh (V) and liquid droplet weight Iw (ng) changes when the drive frequency is changed.

The graph shown in FIG. 7 shows one example of the manner in which the relationship between drive voltage Vh (V) and liquid droplet weight Iw (ng) changes when the drive frequency is changed to 1 kHz, 3 kHz, or 5 kHz, respectively.

In the example shown in FIG. 7, the drive frequency is preferably less than 5 kHz. In the case the drive frequency is 1 kHz or 3 kHz, the droplet weight increases in proportion to the drive voltage. In contrast, if the drive frequency reaches 5 kHz or higher, the discharge state becomes unstable, thereby making this undesirable.

The accuracy of the discharged amount of liquid droplets and the discharge location are both improved by optimizing the drive voltage and drive frequency during discharge of liquid crystal from liquid discharge head 21. Furthermore, in the aforementioned examples, the weight of a single discharged liquid droplet is 8 to 16 ng in the case the drive voltage is from 20 V to less than 32 V and the drive frequency is less than 5 kHz.

In the present example, FIGS. 5A and 5B show the arrangement of liquid crystal on substrate 20 for actual treatment based on the aforementioned liquid crystal arrangement method. FIG. 5A shows the state immediately after arrangement of liquid droplets, and FIG. 5B shows the state after a predetermined time has elapsed.

As shown in FIGS. 5A and 5B, the liquid droplets spread out on substrate 20 after impact on substrate 20, and adjacent liquid droplets then join together, resulting in the formation of a liquid crystal film on substrate 20.

In the present example, as described above, liquid droplets are arranged on substrate 20 at an arrangement pitch P1 which is roughly equal to the impact diameter L1 of the liquid droplets. Consequently, when adjacent liquid droplets join together, the size of the joined portion becomes smaller. Namely, since the impact diameter of the liquid droplets is roughly the same as the arrangement pitch of the liquid droplets, the spread of the liquid droplets after they have joined is smaller, making it difficult for the joined portion to increase in size. In contrast, if the impact diameter of the liquid droplets is excessively large as compared with the arrangement pitch of the liquid droplets, the joined liquid droplets further spread out, the material of adjacent liquid droplets ends up mixing, and the size of the joined portion increases. In addition, if the impact diameter of the liquid droplets is excessively small as compared with the arrangement pitch of the liquid droplets, liquid droplets do not join and the peripheral edges of the liquid droplets tend to remain as is in the form of drop marks. By allowing liquid droplets to join and restricting the size of their joined portions to a small size as in the present example, drop marks can be reduced.

Here, the arrangement pitch of the liquid droplets is preferably 50% to 150%, and more preferably 80% to 120%, of the liquid droplet impact diameter. If the arrangement pitch of the liquid droplets is less than 50% of the impact diameter, there is the risk of drop marks becoming conspicuous due to the occurrence of interference between liquid droplets, thereby making this undesirable. If the arrangement pitch of the liquid droplets is more than 150% of the impact diameter, the liquid droplets do not join, resulting in the risk of drop marks becoming conspicuous due to the liquid droplets remaining in their original form on the substrate, thereby making this undesirable. Drop marks can therefore be reliably reduced by making the arrangement pitch of liquid crystal 80% to 120% of the impact diameter.

In addition, a plurality of pixel regions PX are arranged on substrate 20 in this example, and liquid droplets are made to impact at the locations of the centers of each of the plurality of pixel regions PX. Consequently, the joined portions of the liquid droplets are located at the boundaries (e.g., bank portions) of the plurality of pixel regions PX, and decreases in visibility of the pixels caused by drop marks forming at the joined portions are inhibited. Namely, even if drop marks of liquid droplets occur at the joined portions, since those drop marks are located in non-display regions, decreases in visibility are inhibited.

In this case, by making the diameter L1 of the liquid droplets after impact to be roughly equal to the arrangement pitch P2 of the plurality of pixel regions PX, the arrangement pitch P1 of the liquid droplets becomes roughly equal to the impact diameter L1 of the liquid droplets, thereby reliably reducing drop marks for the same reason as described above.

Next, an example using the previously described film forming method and liquid crystal arrangement method in the production process of a liquid crystal device are explained. First, an explanation is provided of an example of the configuration of a liquid crystal device.

Figure 8:
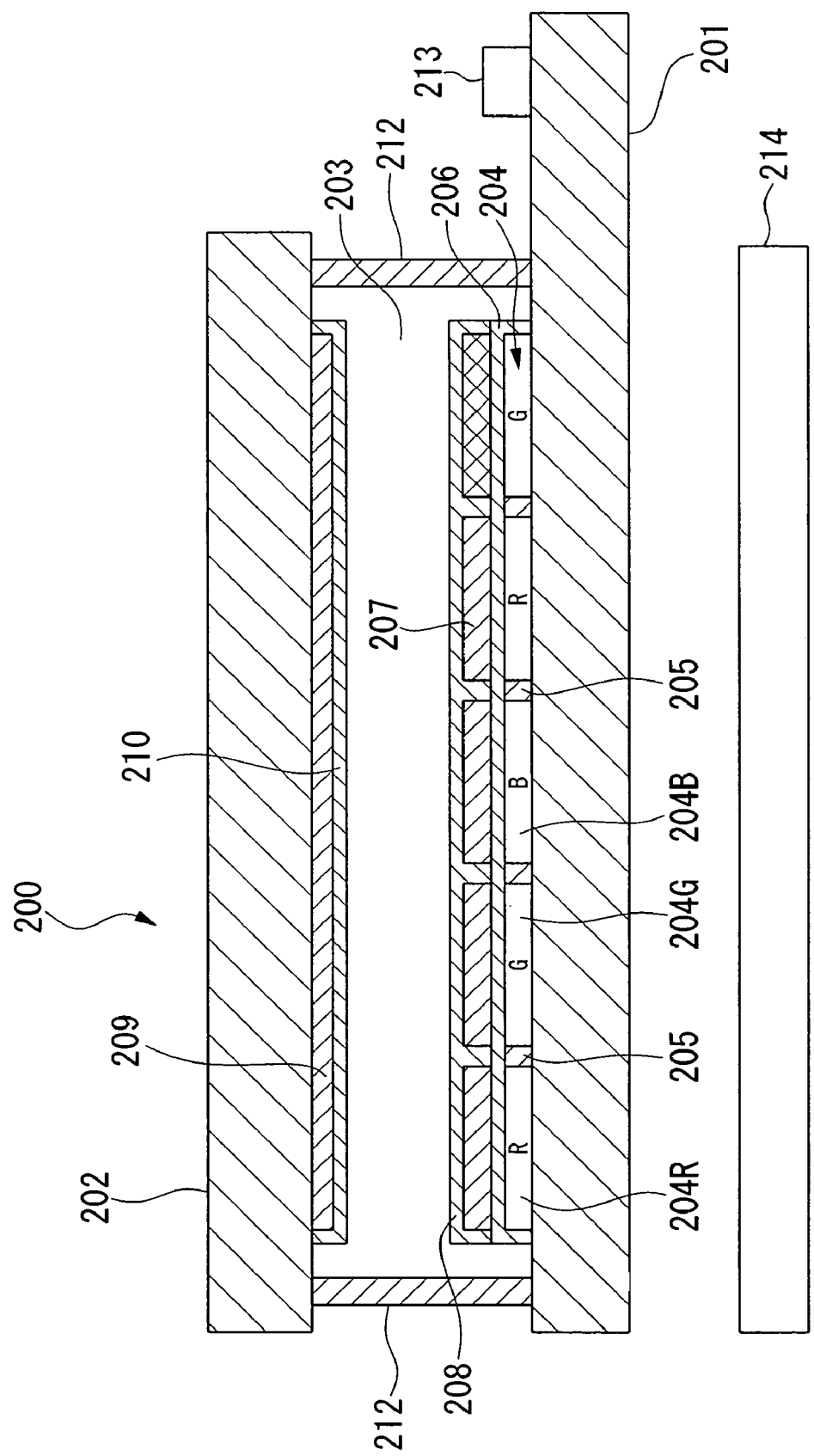
FIG. 8 is a schematic diagram showing one example of the cross-sectional structure of a liquid crystal device (liquid crystal display device).

FIG. 8 schematically shows a cross-sectional structure of passive matrix type liquid crystal device (liquid crystal display device). Liquid crystal device 200 is a transmission type liquid crystal device which is composed of a structure in which a liquid crystal layer 203 composed of Super Twisted Nematic (STN) liquid crystal and the like is interposed between a pair of glass substrates 201 and 202. Moreover, it is provided with a driver IC 213 for supplying a drive signal to the liquid crystal layer, and a backlight 214 which serves as the light source.

Color filter 204 is arranged on the inner surface of glass substrate 201. Color filter 204 is composed by regularly arranging colored layers 204R, 204G, and 204B composed of each of the colors of red (R), green (G), and blue (B). Furthermore, partition 205 composed of a black matrix or bank and the like is formed between these colored layers 204R (204G and 204B). In addition, overcoat film 206 is provided on color filter 204 and partition 205 for eliminating the level difference formed by color filter 204 and partition 205 to impart a flat surface.

A plurality of electrodes 207 are formed in a striped pattern on overcoat film 206, and an alignment film 208 is additionally formed thereon.

A plurality of electrode 209 are formed in a striped pattern on the inner surface of the other glass substrate 202 so as to be perpendicular to the aforementioned electrodes on color filter 204, and alignment film 210 is formed on these electrodes 209. Furthermore, each of colored layers 204R, 204G, and 204B of the aforementioned color filter 204 are respectively arranged at locations corresponding to the intersecting locations of electrodes 209 of glass substrate 202 and electrodes 207 of the aforementioned glass substrate 201. In addition, electrodes 207 and 209 are formed from a transparent conductive material such as indium tin oxide (ITO). Deflecting plates (not shown) are respectively provided on the outer surfaces of glass substrate 202 and color filter 204. Spacers (not shown) for maintaining a fixed interval (cell gap) between substrates 201 and 202, and sealing materials 212 for isolating liquid crystal 203 from the outside air, are arranged between glass substrates 201 and 202. Heat-cured or photo-cured resin, for example, is used as sealing materials 212.

In this liquid crystal device 200, the aforementioned alignment films 208 and 210 are formed on the glass substrates using the aforementioned film forming method. In addition, the aforementioned liquid crystal layer 203 is arranged on the glass substrate using the aforementioned liquid crystal arrangement method. Consequently, in this liquid crystal device 200, drop marks are inconspicuous and visibility is improved in alignment films 208 and 210, and liquid crystal layer 203.

Figure 9A:
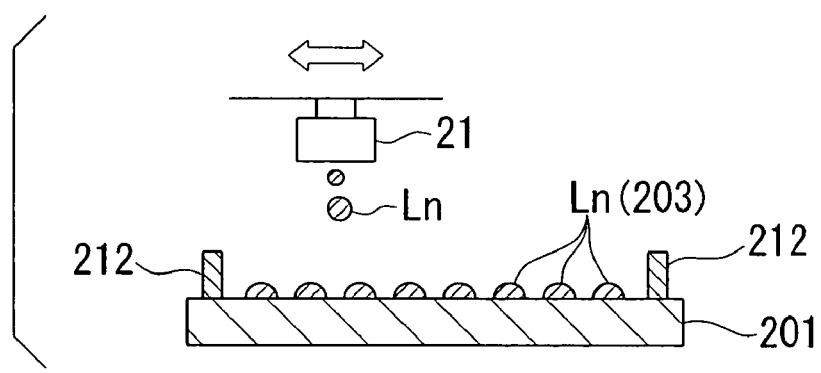
FIG. 9A is a schematic diagram showing a step in which liquid crystal is quantitatively arranged on a glass substrate in a liquid crystal device production method.
Figure 9B:
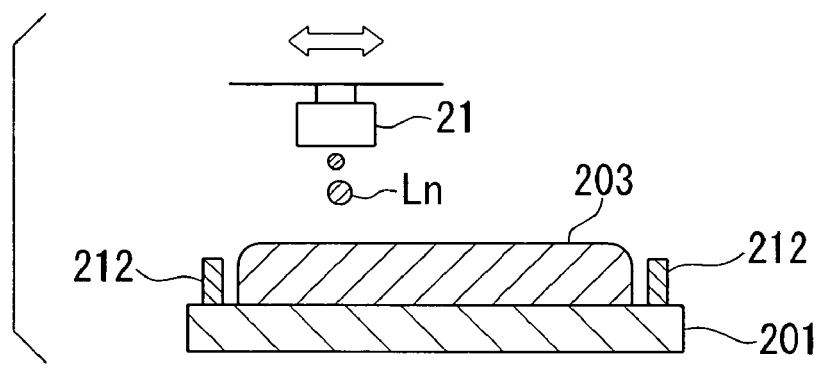
FIG. 9B is a schematic diagram showing a step in which liquid crystal is quantitatively arranged on a glass substrate in a liquid crystal device production method.

FIGS. 9A through 9D schematically show a production method of the aforementioned liquid crystal device 200. FIGS. 9A and 9B indicate a step in which liquid crystal is quantitatively arranged on a glass substrate, and FIGS. 9C and 9D indicate a step in which the liquid crystal is sealed. Furthermore, in FIGS. 9A through 9D, the electrodes, color filter, spacers, and the like on the glass substrates are omitted from the drawings for the sake of simplicity.

In FIGS. 9A and 9B, a predetermined amount of liquid crystal is quantitatively arranged on glass substrate 201 using the aforementioned arrangement method in the step in which liquid crystal is arranged.

Namely, as shown in FIG. 9A, liquid crystal is discharged in the form of liquid droplets Ln from the nozzles of liquid discharge head 21 while relatively moving liquid discharge head 21 with respect to glass substrate 201 to arrange liquid droplets Ln on glass substrate 201. Then, as shown in FIG. 9B, the operation of arranging liquid droplets Ln is repeated a plurality of times until the liquid crystal arranged on glass substrate 201 reaches a predetermined amount. The predetermined amount of liquid crystal to be arranged on glass substrate 201 is nearly equal to the volume of the space formed between the glass substrates after sealing.

Conditions for discharging liquid droplets Ln, such as the volume of the liquid droplets Ln, the location at which they are arranged, are controlled during quantitatively arrangement of the liquid crystal. In the present example, since liquid crystal is arranged on glass substrate 201 in the form of liquid droplets Ln, the amount and location of liquid crystal arranged on glass substrate 201 can be finely controlled, thereby making it possible to uniformly arrange liquid crystal 203 on glass substrate 201.

Figure 9C:
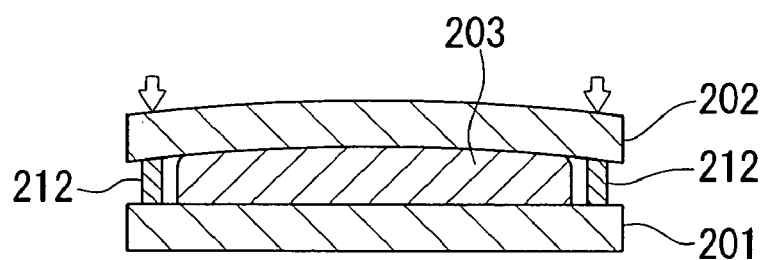
FIG. 9C is a schematic diagram showing a step in which the liquid crystal is sealed.
Figure 9D:
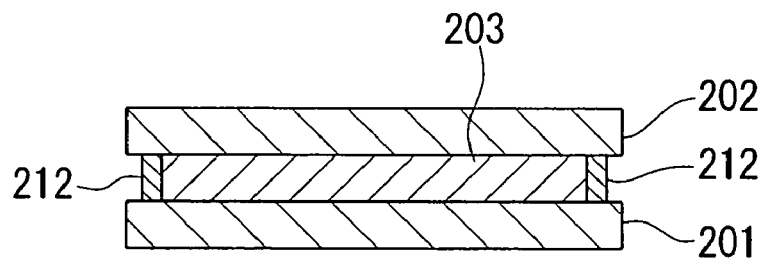
FIG. 9D is a schematic diagram showing a step in which the liquid crystal is sealed.

Next, in FIGS. 9C and 9D, the other glass substrate 202 is laminated under reduced pressure on glass substrate 201 on which a predetermined amount of liquid crystal 203 is arranged with sealing materials 212 interposed therebetween.

More specifically, as shown in FIG. 9C, pressure is first applied mainly to the edges of glass substrates 201 and 202 on which sealing materials 212 are arranged to adhere the sealing materials 212 to substrates 201 and 202. Subsequently, after a predetermined time is elapsed and sealing materials 212 are allowed to dry to a certain extent, pressure is applied to the entire outer surfaces of glass substrates 201 and 202 to cause liquid crystal 203 to be distributed through the space formed between both substrates 201 and 202.

In this case, when liquid crystal 203 contacts sealing materials 212, since sealing materials 212 have already dried to a certain extent, there is little decrease in performance of sealing materials 212 or little deterioration of liquid crystal 203 accompanying contact between sealing materials 212 and liquid crystal 203.

After laminating glass substrates 201 and 202, heat or light is imparted to sealing materials 212 to cure sealing materials 212, thereby sealing the liquid crystal between glass substrates 201 and 202.

A liquid crystal device produced in this manner is able to reduce costs since it only consumes a small amount of liquid crystal. In addition, there are minimal decreases in display quality accompanying the formation of drop marks in the liquid crystal.

Figure 10A:
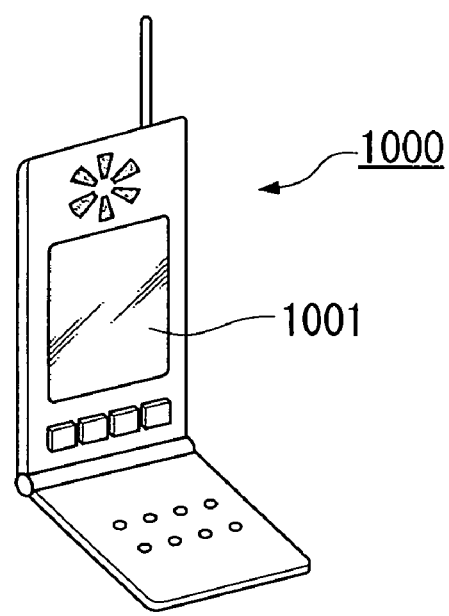
FIG. 10A is a diagram showing an example of applying the electronic equipment of the present invention to a cell phone.
Figure 10B:
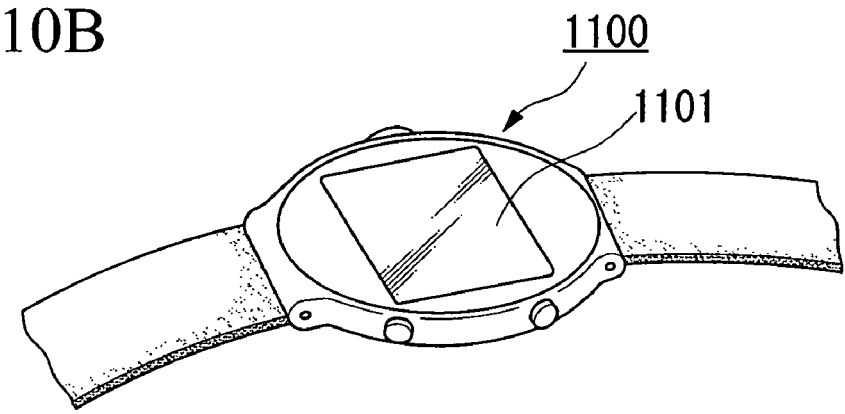
FIG. 10B is a diagram showing an example of applying the electronic equipment of the present invention to a portable information processing device.
Figure 10C:
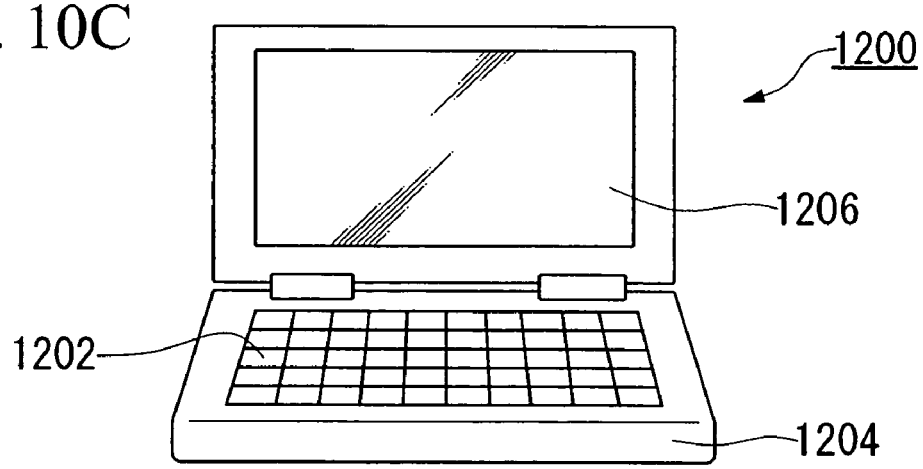
FIG. 10C is a diagram showing an example of applying the electronic equipment of the present invention to a wristwatch-type electronic device.

FIGS. 10A through 10C show embodiments of electronic equipment according to the present invention.

Electronic equipment of the present example is provided with a liquid crystal device according to the present invention as a display unit.

FIG. 10A is a perspective view showing one example of a cellular phone. In FIG. 10A, the cellular phone comprises a cell phone body 1000 and a display 1001 using the aforementioned liquid crystal device.

FIG. 10B is a perspective view showing one example of a wristwatch type electronic device. In FIG. 10B, the wristwatch type electronic device comprises a wristwatch body 1100 and a display 1101 using the aforementioned liquid crystal device.

FIG. 10C is a perspective view showing one example of a portable information processing device such as a word processor and personal computer. In FIG. 10C, the portable information processing device comprises an information processing device 1200, an input section 1202 such as a keyboard, an information processing device body 1204, and a display 1206 using the aforementioned liquid crystal device.

Since the electronic equipment respectively shown in FIGS. 10A through 10C are provided with the liquid crystal device of the present invention as a display unit, high visibility and improved quality can be obtained.

Furthermore, although a passive matrix type liquid crystal device is used in the present embodiment, an active matrix type liquid crystal device may also be used wherein the active matrix type liquid crystal device comprises a thin film diode (TFD) or thin film transistor (TFT) as a switching element.

FIGS. 11A and 11B show an example of an active matrix type liquid crystal device (liquid crystal display device) using a TFT as a switching element. FIG. 11A is a perspective view showing the whole structure of the liquid crystal display device of this example, and FIG. 11B is an enlarged view of a single pixel in FIG. 11A.

In FIG. 11, liquid crystal device 580 of this example has element substrate 574 (the first substrate) on the side on which the TFT elements are formed and opposing substrate 575 (the second substrate) arranged in mutual opposition, sealing material 573 is arranged in the form of a frame between these substrates 574 and 575, and a liquid crystal layer (not shown) is sealed in the region surrounded by sealing material 573 between the substrates 574 and 575.

Figure 12:
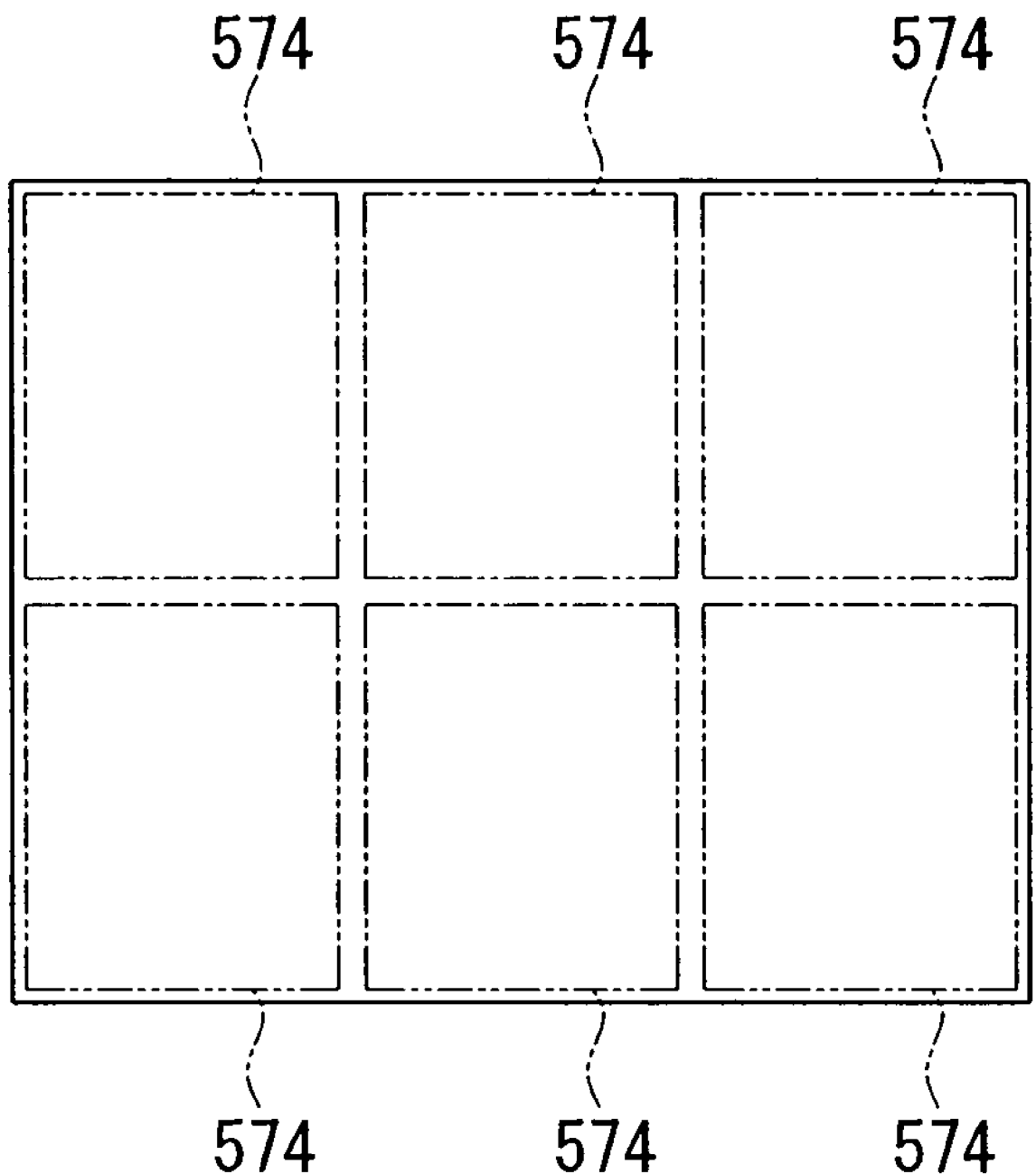
FIG. 12 is a schematic diagram showing an example of a multiple panel by which a substrate (panel) for a liquid crystal device is produced using a large substrate.

Here, FIG. 12 is a schematic drawing showing an example of multiple panels by which the aforementioned element substrate (the first substrate) and opposing substrate (the second substrate) for the liquid crystal device are produced using large substrates (e.g., 1500 mm×1800 mm). In the example of FIG. 12, a plurality (six in this example) of panels (e.g., element substrates 574) are produced from a single large substrate, and TFT elements as shown in FIGS. 11A and 11B are formed in each of the element substrates 574. Furthermore, a plurality of the opposing substrates 575 shown in FIGS. 11A and 11B can also be produced from a single large substrate in the same manner.

In FIGS. 11A and 11B, a large number of source lines 576 (data lines) and a large number of gate lines 577 (scanning lines) are provided on the upper surface of the liquid crystal side of element substrate 574 so as to be mutually intersecting like a lattice. A TFT element 578 is formed in the vicinity of the intersection of each source line 576 and gate line 577, each source line 576 and gate line 577 is connected to a pixel electrode 579 through each TFT element 578, and a large number of pixel electrodes 579 are arranged in the horizontal plane in the form of a matrix. On the other hand, a common electrode 585 made of a transparent conductive material composed of ITO and the like is formed corresponding to the display region on the surface of the liquid crystal side of opposing substrate 575.

As shown in FIG. 11B, each TFT element 578 has gate electrode 581 extending from gate wire 577, an insulating film (not shown) covering gate electrode 581, a semiconductor layer 582 formed on the insulating film, source electrode 583 extending from source line 576 connected to the source region within semiconductor layer 582, and drain electrode 584 connected to the drain region within semiconductor layer 582. Drain electrode 584 of TFT element 578 is connected to pixel electrode 579.

Figure 13:
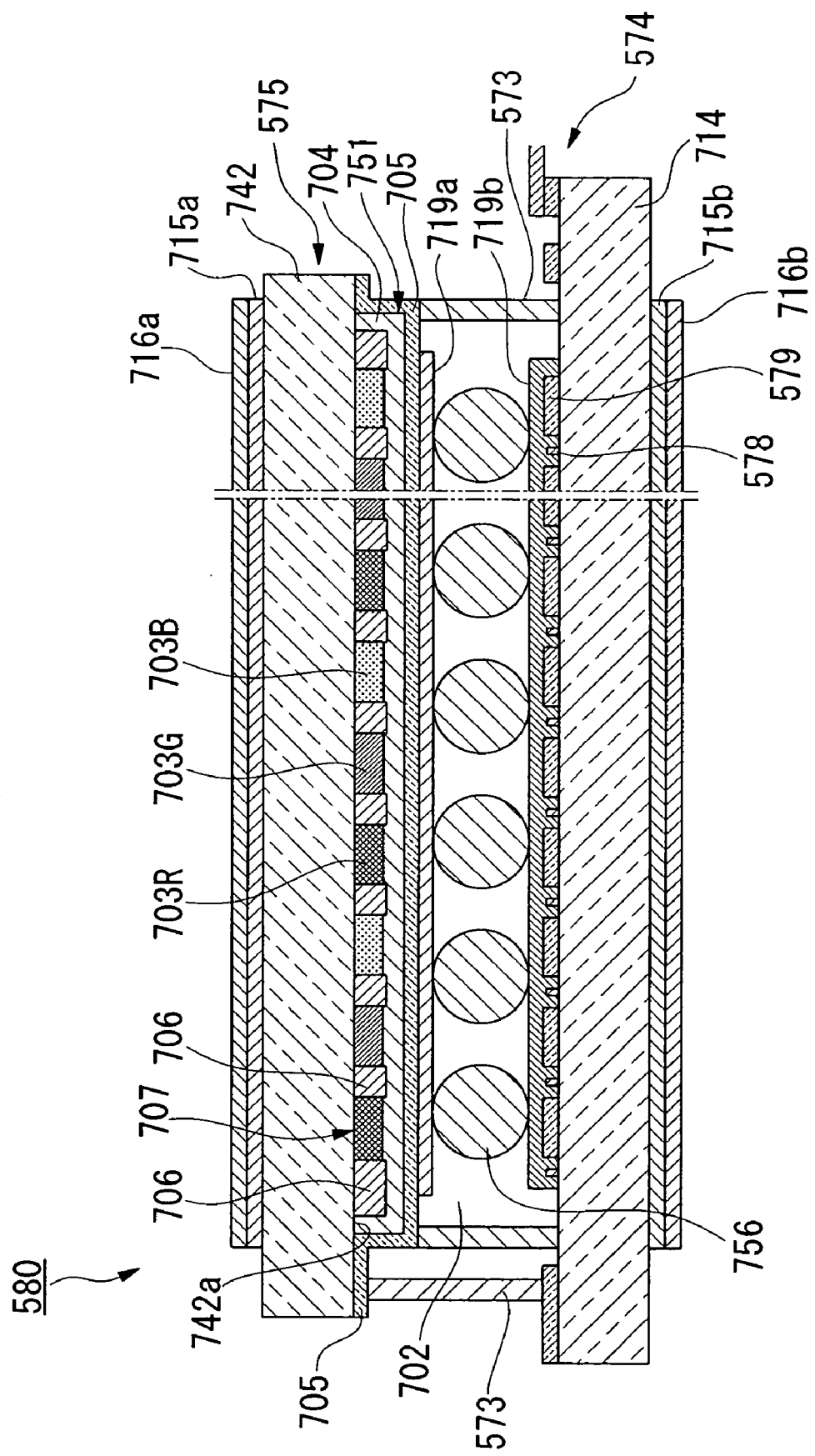
FIG. 13 is a cross-sectional block diagram of an active matrix type liquid crystal device (liquid crystal display device).

FIG. 13 is a cross-sectional block diagram of an active matrix type liquid crystal device (liquid crystal display device).

Liquid crystal device 580 is mainly composed of a liquid crystal panel provided with element substrate 574 and opposing substrate 575 arranged to be mutually opposing, liquid crystal layer 702 held therebetween, phase difference plate 715*a* and polarizing plate 716*a* provided on opposing substrate 575, and phase difference plate 715*a* and polarizing plate 716*b* provided on element substrate 574. A finished product in the form of a liquid crystal device is composed by mounting a liquid crystal driver chip, wires for transmitting electrical signals, and incidental elements such as supports on this liquid crystal panel.

Opposing substrate 575 is mainly composed of light-transmitting substrate 742 and color filter 751 formed on this substrate 742. Color filter 751 is composed of partition 706, colored layers 703R, 703G, and 703B as filter elements, and protective film 704 which covers partition 706 and colored layers 703R, 703G, and 703B.

Partition 706 is in the form of a lattice which is formed so as to respectively surround filter element forming regions 707 serving as colored layer forming regions which form each colored layer 703R, 703G and 703B, and is formed on one side 742*a* of substrate 742.

In addition, partition 706 is made from, for example, a black photosensitive resin film. A black photosensitive resin film containing at least a positive or negative photosensitive resin like that used in ordinary photoresist, and a black inorganic pigment like carbon black or a black organic pigment, is used for this black photosensitive resin film. Since this partition 706 contains a black inorganic pigment or organic pigment, and is formed at locations other than the locations where colored layers 703R, 703G, and 703B are formed, transmission of light between colored layers 703R, 703G, and 703B is blocked, thereby enabling this partition 706 to function as a light blocking film.

Colored layers 703R, 703G, and 703B are formed by respectively introducing, namely discharging, by an ink jet method red (R), green (G), and blue (B) filter element ink into the filter element forming regions 707 provided along the inner wall of partition 706 and substrate 742 followed by drying.

In addition, an electrode layer 705 for driving the liquid crystal composed of a transparent, electrically conductive material such as indium tin oxide (ITO) is formed roughly over the entire surface of protective film 704. Moreover, alignment film 719*a* is provided covering this electrode layer 705 for liquid crystal driving, and alignment film 719*b* is also provided on pixel electrode 579 on the side of element substrate 574.

Element substrate 574 has an insulating layer (not shown) formed on light-transmitting substrate 714, and a TFT element 578 and a pixel electrode 579 are formed on this insulating layer. In addition, a plurality of scanning lines and a plurality of signal lines are formed in the form of a matrix as shown in FIG. 11 on the insulating layer formed on substrate 714, the pixel region 579 is provided for each region surrounded by these scanning lines and signal lines, TFT element 578 is incorporated at the location where the scanning lines and signal lines are electrically connected with each pixel electrode 579, and the flow of power to pixel electrodes 579 is controlled by switching TFT element 578 on and off by applying signals to the scanning lines and signal lines. In addition, in this embodiment, electrode layer 705 formed on the side of opposing electrode 575 is in the form of a total surface electrode which covers the entire pixel region. Furthermore, various TFT wiring circuits and pixel electrode shapes can be applied.

Element substrate 574 and opposing substrate 575 are laminated at a predetermined interval using sealing material 573 formed along the outer periphery of opposing electrode 575. Furthermore, spacers 576 maintain a constant interval (cell gap) between both substrates within the substrate plane. A rectangular liquid crystal sealing region is compartmentalized by sealing material 573 roughly in the shape of a frame when viewed from overhead between element substrate 574 and opposing substrate 575, and liquid crystal is sealed within this liquid crystal sealing region.

FIGS. 14A through 14E are diagrams for explaining one example of method for producing color filter 751.

Figure 14A:
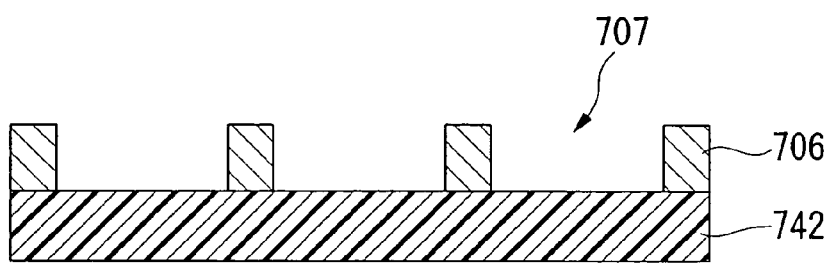
FIG. 14A is a diagram showing partitions formed on a substrate in an example of a color filter production method.

First, as shown in FIG. 14A, partition 706 (black matrix) is formed on one side of transparent substrate 742. When forming this partition 706, a non-light-transmitting resin (preferably a black resin) is coated to a predetermined thickness (e.g., about 2 μm) by a method such as spin coating followed by patterning using photolithography technology. Alternatively, an ink jet process may also be used. The smallest display element surrounded by the lattices of partition 706, namely, filter element forming region 707, has, for example, a width in the X direction of about 30 μm and a length in the Y direction of about 100 μm.

Figure 14B:
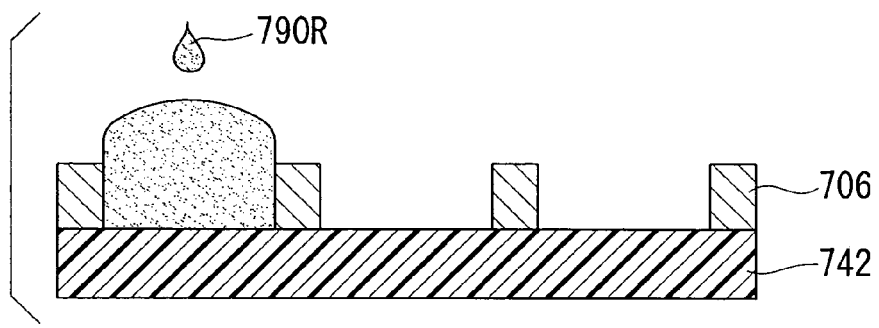
FIG. 14B is a diagram showing ink droplets R discharged and impact on a substrate in an example of a color filter production method.
Figure 14C:
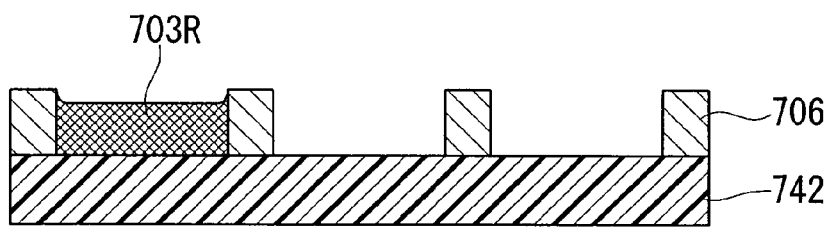
FIG. 14C is a diagram showing a colored layer R formed by prebaking in an example of a color filter production method.
Figure 14D:
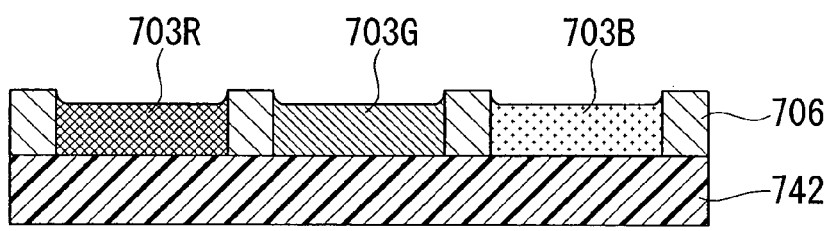
FIG. 14D is a diagram showing colored layers G and B in an example of a color filter production method.

Next, as shown in FIG. 14B, red ink droplets 790R (liquid state) are discharged and made to impact on substrate 742. The amount of the discharged red ink droplets 790R is an adequate amount in consideration of the reduction in volume of the ink in the heating step. Next, the ink is pre-baked to form red colored layer 703R as shown in FIG. 14C. The aforementioned steps are repeated for each of the colors red, green, and blue to sequentially form colored layers 703G and 703B as shown in FIG. 14D. After forming all colored layers 703R, 703G, and 703B, colored layers 703R, 703G, and 703B are baked all at once.

Figure 14E:
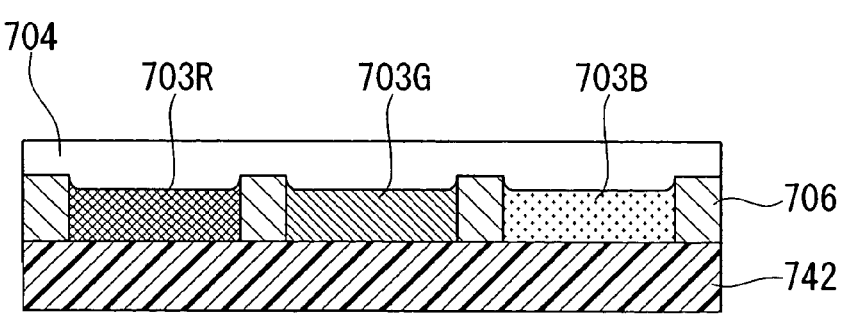
FIG. 14E is a diagram showing an overcoat layer coating all colored layers and partitions in an example of a color filter production method.

Next, an overcoat film (protective film 704) is formed that covers each of the colored layers 703R, 703G, and 703B as well as partition 706 as shown in FIG. 14E to impart a flat surface to substrate 742 and protect colored layers 703R, 703G, and 703B. Although a method such as spin coating, roll coating, or dipping may be employed for forming this protective film 704, an ink jet process may also be used similar to the case of color layered 703R, 703G, and 703B.

Furthermore, in addition to a transmission type panel, the liquid crystal device in the present invention can also be applied to a reflective panel or a semi-transmitting, reflective panel.

Although the above has provided an explanation of preferable embodiments of the present invention with reference to the attached drawings, it goes without saying that the present invention is not limited to these examples. In the aforementioned examples, the various forms and combinations of each of the indicated constituent members are merely examples, and may be altered in various ways based on the design requirements and the like within a range that does not deviate from the gist of the present invention.

The entire disclosures of JP 2003-067006 filed Mar. 12, 2003; JP 2003-067007 filed Mar. 12, 2003; and JP 2004-033600 filed Feb. 10, 2004 are incorporated by reference.

What is claimed is:

1. A liquid crystal discharging method for discharging liquid crystals from a discharge unit to arrange the liquid crystals on a substrate on which a plurality of pixel regions composed of a plurality of pixels are formed, the discharge unit including a plurality of nozzles for discharging the liquid crystals in a form of liquid droplets, the liquid crystal discharging method comprising:

determining an arrangement pitch of the liquid droplets to be arranged in line on the substrate based on a diameter of the liquid droplets after impact of the liquid droplets on the substrate, which was measured in advance;

measuring a weight of the single liquid droplet for obtaining said diameter; and discharging the liquid droplets from the nozzles such that:

each of the liquid droplets has said weight;

thereby, the diameter of the liquid droplets after impact is roughly equal to the arrangement pitch of the plurality of pixel regions, to coat each of the plurality of pixel regions with the liquid droplets having a joined portion therebetween; and the joined portion of the liquid droplets is located at a boundary of the pixel regions.

2. The liquid crystal discharging method according to claim 1, wherein the arrangement pitch of the liquid droplets is roughly equal to the diameter of the liquid droplets after impact.

3. The liquid crystal discharging method according to claim 1, wherein the arrangement pitch is obtained by selecting a subset of the nozzles having a pitch therebetween equal to the arrangement pitch, among the plural nozzles.

* * * * *